United States Patent
Naito et al.

(10) Patent No.: US 6,755,884 B2
(45) Date of Patent: Jun. 29, 2004

(54) NIOBIUM POWDER FOR CAPACITOR, SINTERED BODY THEREOF AND CAPACITOR USING THE SINTERED BODY

(75) Inventors: Kazumi Naito, Chiba (JP); Nobuyuki Nagato, Saitama (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/182,205

(22) PCT Filed: Nov. 30, 2001

(86) PCT No.: PCT/JP01/10486
§ 371 (c)(1),
(2), (4) Date: Jul. 26, 2002

(87) PCT Pub. No.: WO02/45108
PCT Pub. Date: Jun. 6, 2002

(65) Prior Publication Data

US 2003/0100185 A1 May 29, 2003

Related U.S. Application Data

(60) Provisional application No. 60/268,967, filed on Feb. 16, 2001.

(30) Foreign Application Priority Data

Nov. 30, 2000 (JP) ........................................ 2000-366044

(51) Int. Cl.$^7$ .................................................. B22F 1/00
(52) U.S. Cl. ........................ 75/252; 75/245; 361/321.1; 361/523
(58) Field of Search .................... 75/252, 245; 361/523, 361/321.1

(56) References Cited

U.S. PATENT DOCUMENTS

| 5,448,447 | A | * | 9/1995 | Chang ........................ 361/529 |
| 6,051,044 | A | * | 4/2000 | Fife ............................. 75/229 |
| 6,375,704 | B1 | * | 4/2002 | Habecker et al. ............. 75/229 |
| 6,391,275 | B1 | * | 5/2002 | Fife ........................ 423/594.8 |
| 6,402,066 | B1 | * | 6/2002 | Habecker et al. ............. 241/21 |
| 6,420,043 | B1 | * | 7/2002 | Fife et al. .................... 428/472 |
| 6,558,447 | B1 | * | 5/2003 | Shekhter et al. .............. 75/252 |

FOREIGN PATENT DOCUMENTS

| JP | 7-508618 | 9/1995 |
| WO | WO 00/15555 | 3/2000 |

OTHER PUBLICATIONS

International Search Report, for PCT/JP01/10486, dated Feb. 26, 2002.

* cited by examiner

*Primary Examiner*—Ngoclan Mai
(74) *Attorney, Agent, or Firm*—Sughrue Mion, PLLC

(57) ABSTRACT

A niobium powder for capacitors, having an average particle size of from 10 to 500 μm, which is a granulated powder having an oxygen content of 3 to 9% by mass; a sintered body thereof; and a capacitor fabricated from the sintered body as one part electrode, a dielectric material formed on the surface of the sintered body, and another part electrode provided on the dielectric material. A capacitor manufactured from the sintered body of a niobium powder of the present invention is prevented from deterioration in the performance for a long period of time and has high reliability.

13 Claims, No Drawings

NIOBIUM POWDER FOR CAPACITOR, SINTERED BODY THEREOF AND CAPACITOR USING THE SINTERED BODY

CROSS-REFERENCE TO RELATED APPLICATIONS

This application is based on the provisions of 35 U.S.C. Article 111(a) with claiming the benefit of filing dates of U.S. provisional application Serial No. 60/268,967 filed on Feb. 16, 2001, under the provisions of 35 U.S.C. 111(b), pursuant to 35 U.S.C. Article 119(e) (1).

TECHNICAL FIELD

The present invention relates to a niobium powder from which a capacitor capable of maintaining the performance for a long period of time and having good reliability can be produced, and also relates to a niobium sintered body and a capacitor using the sintered body.

BACKGROUND ART

Capacitors for use in electronic instruments such as potable telephone and personal computer are demanded to have a small size and a large capacitance. Among these capacitors, a tantalum capacitor is preferred because of its large capacitance for the size and good performance. In this tantalum capacitor, a sintered body of tantalum powder is generally used for the anode moiety. In order to increase the capacitance of the tantalum capacitor, it is necessary to increase the weight of the sintered body or to use a sintered body increased in the surface area by pulverizing the tantalum powder.

The former method of increasing the weight of the sintered body necessarily involves enlargement of the capacitor shape and cannot satisfy the requirement for downsizing. On the other hand, in the latter method of pulverizing tantalum powder to increase the surface area, the pore size of the tantalum sintered body decreases or closed pores increase at the stage of sintering and therefore, impregnation of the cathode agent in the later process becomes difficult. As one of means for solving these problems, a capacitor using a sintered body of powder of a material having a dielectric constant larger than that of tantalum is being studied. The material having a larger dielectric constant includes niobium.

However, niobium has a large affinity for oxygen as compared with tantalum and therefore, is readily oxidized. This tendency is more outstanding as the niobium is in the form of powder and the specific surface area thereof is larger. Furthermore, the oxidation reaction more readily proceeds as the temperature in the environment is higher. In the manufacture of a sintered body from a niobium powder, a molded article of niobium powder is usually sintered under heating in a vacuum and in this process, a reaction with oxygen in an air takes place in some cases at the time of taking out the sintered body from the heating furnace to allow a large amount of oxygen to adhere to the surface. If the amount of oxygen adhered is large, the shape of the sintered body deviates from the designed value in an extreme case. If a capacitor is manufactured from such a sintered body and subjected to an accelerated test at a high temperature, the capacitor performance is sometimes greatly deteriorated and not satisfied in view of reliability.

As for a technology related to the present invention, a capacitor using a partially reduced niobium oxide ($NbO_n$, n=0.7 to 1.1, oxygen content: 11 to 16% by mass) obtained by heat-treating diniobium pentoxide ($Nb_2O_5$) in the presence of hydrogen, which has a large capacitance and excellent leakage current characteristics, has been proposed (see, WO 00/15555). However, when a capacitor is manufactured using a niobium oxide obtained in a test by the present inventors and subjected to an accelerated test at a high temperature, the capacitor performance is deteriorated and not satisfied.

DISCLOSURE OF INVENTION

As a result of extensive investigations to solve the above-described problems, the present inventors have found that when a niobium powder obtained by granulating a powder having an oxygen content previously adjusted to a specific range is used as the starting material niobium powder of a niobium sintered body, a capacitor reduced in the deterioration in an accelerated test at a high temperature and having high reliability can be obtained. The present invention has been accomplished based on this finding.

More specifically, the object of the present invention is to provide a niobium powder for capacitors, a sintered body thereof and a capacitor using the sintered body, which are described below.

1. A niobium powder for capacitors, having an average particle size of from 10 to 500 µm, which is a granulated powder having an oxygen content of 3 to 9% by mass.

2. The niobium powder for capacitors as described in 1 above, wherein the specific surface area is from 0.2 to 15 $m^2/g$.

3. The niobium powder for capacitors as described in 1 or 2 above, which is partially nitrided.

4. The niobium powder for capacitors as described in 3 above, wherein the nitrided amount is 10~100,000 ppm by mass.

5. A sintered body using the niobium powder for capacitors described in any one of 1 to 4 above.

6. The sintered body as described in 5 above, wherein the specific surface area is from 0.2 to 5 $m^2/g$.

7. A capacitor fabricated from the sintered body described in 5 or 6 above as one part electrode, a dielectric material formed on the surface of the sintered body, and another part electrode provided on the dielectric material.

8. The capacitor as described in 7 above, wherein the dielectric material is mainly composed of a niobium oxide.

9. The capacitor as described in 8 above, wherein the niobium oxide is formed by electrolytic oxidation.

10. The capacitor as described in any one of 7 to 9 above, wherein the another part electrode is at least one material selected from an electrolytic solution, an organic semiconductor or an inorganic semiconductor.

11. The capacitor as described in 10 above, wherein the another part electrode is composed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising two or more repeating units represented by the following formula (1) or (2):

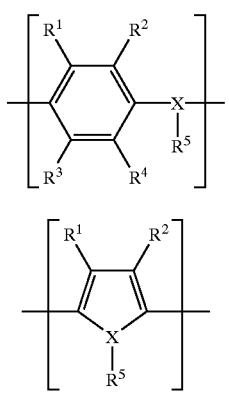

(wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents hydrogen or an alkyl group having from 1 to 6 carbon atoms, and each of the pairs $R^1$ and $R^2$, and $R^3$ and $R^4$ may combine with each other to form a ring).

12. The capacitor as described in 11 above, wherein the organic semiconductor is at least one member selected from polypyrrole, polythiophene polyaniline and substitution derivatives thereof.

DETAILED DESCRIPTION OF INVENTION

The niobium powder for capacitors of the present invention is obtained by granulating a primary particle powder (hereinafter simply referred to as "primary powder") of niobium into an appropriate size.

The primary powder can be granulated by a conventionally known method. Examples of the method include a method where powder particles are left standing at a high temperature of 500 to 2,000° C. in a vacuum and then wet or dry cracked, a method where powder particles are mixed with an appropriate binder such as acrylic resin or polyvinyl alcohol and then cracked, and a method where powder particles are mixed with an appropriate compound such as acrylic resin, camphor, phosphoric acid or boric acid, left standing at a high temperature in a vacuum and then wet or dry cracked. The particle size of the granulated powder can be freely controlled by the degree of granulation and cracking, however, a granulated powder having an average particle size of 10 to 500 μm is usually used. The granulated powder may be classified after the granulation and the cracking. After the granulation, the granulated powder may also be mixed with an appropriate amount of non-granulated powder.

The niobium powder for capacitors of the present invention is preliminarily adjusted to have an oxygen content of 3 to 9% by mass.

As described above, when a niobium powder is sintered and molded and then the sintered body is taken out into an air, an oxidation reaction is abruptly caused and by the heat of reaction, the sintered body is heated to accelerate the oxidation reaction. This tendency is more outstanding as the particle size of niobium powder used is smaller. In the present invention, a granulated niobium powder having a predetermined particle size is used and furthermore, the granulated niobium powder preliminarily contains from 3 to 9% by mass of oxygen, so that the abrupt oxidation reaction occurring at the time of taking out the sintered body into an air after the sintering is relaxed and a capacitor having stable performance can be obtained.

If the oxygen content of the niobium powder is less than 3% by mass, the effect of relaxing the abrupt oxidation reaction occurring at the time of taking out the sintered body into an air after the sintering is diminished, whereas if it exceeds 9% by mass, the leakage current (LC) characteristics of the capacitor manufactured are disadvantageously worsened in some cases.

The niobium powder containing a predetermined oxygen amount can be prepared by preliminarily oxidizing a niobium primary powder or a granulated powder thereof. The oxidation can be performed, for example, by allowing the niobium powder to stand in an air or by stirring the niobium powder in an atmosphere at an appropriate temperature. The oxygen content can be easily adjusted and controlled by performing a preliminary experiment.

The specific surface area of the thus-produced powder of the present invention is from 0.2 to 15 m²/g.

The raw material used for the niobium primary powder may be a material generally available on the market. For example, a primary powder obtained by the reduction of niobium halide using magnesium or sodium, the sodium reduction of potassium fluoroniobate, the molten salt (NaCl+KCl) electrolysis of potassium fluoroniobate on a nickel cathode, the reduction of niobium pentoxide powder using an alkali metal, an alkaline earth metal or hydrogen, or the introduction of hydrogen into a metal niobium ingot, followed by pulverization and dehydrogenation may be used. Also, a primary powder comprising niobium fine particles obtained by the evaporation or ablation of niobium metal in an inert gas using a heat source such as electron beam, plasma or laser, or by the decomposition of niobium complex, may be used. Among these, the primary powders having an average particle size of, for example, from 0.1 to tens of μm can be used.

A part of the niobium primary powder for use in the present invention is preferably nitrided.

The nitrided amount is from 10 ppm by mass to 100,000 ppm by mass. By this partial nitridation, the capacitor manufactured can be improved in the leakage current (LC) characteristics. More specifically, the nitrided amount is preferably from 300 to 7,000 ppm by mass in order to reduce the LC value which is measured in an aqueous phosphoric acid solution after a sintered body is manufactured from the niobium powder and a dielectric material is formed on the surface of the sintered body. The "nitrided amount" as used herein is an amount of nitrogen reacted with and bonded to the niobium powder and excludes nitrogen adsorbed to the niobium powder.

The nitridation of the niobium powder can be performed by liquid nitridation, ion nitridation, gas nitridation or a combination thereof. Among these, gas nitridation is preferred because the apparatus therefor is simple and the operation is easy.

The gas nitridation can be performed by allowing the niobium powder to stand in a nitrogen gas atmosphere. With a temperature of 2,000° C. or less in the nitridation atmosphere and a standing time of several hours or less, a niobium powder having an objective nitrided amount can be obtained. The treatment time can be shortened by performing the treatment at a high temperature. The amount of niobium powder nitrided can be easily controlled by the conditions confirmed by a preliminary test or the like on the nitridation temperature and nitridation time of the material to be nitrided.

The nitridation can be performed after the production of a primary powder or after the production of a granulated powder. The nitridation may also be performed a plurality of times every each production of the powder.

The niobium sintered body of the present invention is produced by sintering the above-described niobium powder. The production method of the sintered body is not particularly limited but, for example, the niobium powder is press-molded into a predetermined shape and then heated at 500 to 2,000° C. for several minutes to several hours under a pressure of $10^{-4}$ to $10^{-1}$ Pa, whereby the sintered body is obtained.

A lead wire comprising a valve-acting metal such as niobium or tantalum may be prepared to have an appropriate shape and an appropriate length and integrally molded at the above-described press-molding of niobium powder while inserting a part of the lead wire into the inside of the molded article, so that the lead wire can be designed to work out to a leading line of the sintered body.

The specific surface area of the thus-produced niobium sintered body of the present invention can be freely adjusted, however, a niobium sintered body having a specific surface area of 0.2 to 5 $m^2/g$ is usually used.

The capacitor of the present invention is fabricated from the above-described sintered body as one part electrode, a dielectric material formed on the surface of the sintered body, and another part electrode provided on the dielectric material.

Examples of the dielectric material for the capacitor include a dielectric material composed of a tantalum oxide, a niobium oxide, a polymer substance or a ceramic compound, with the dielectric material composed of a niobium oxide being preferred. The dielectric material composed of a niobium oxide can be obtained by chemically forming the niobium sintered body as one part electrode in an electrolytic solution. For chemically forming the niobium electrode in an electrolytic solution, an aqueous protonic acid solution is generally used, such as aqueous 0.1% phosphoric acid solution or aqueous sulfuric acid solution. In the case of obtaining a dielectric material composed of a niobium oxide by chemically forming the niobium electrode in an electrolytic solution, the capacitor of the present invention is an electrolytic capacitor and the niobium side serves as anode.

In the capacitor of the present invention, the another part electrode is not particularly limited and for example, at least one compound selected from electrolytic solutions, organic semiconductors and inorganic semiconductors known in the art of aluminum electrolytic capacitor, can be used.

Specific examples of the electrolytic solution include a dimethylformamide-ethylene glycol mixed solution having dissolved therein 5% by mass of isobutyltripropylammonium borotetrafluoride electrolyte, and a propylene carbonate-ethylene glycol mixed solution having dissolved therein 7% by mass of tetraethylammonium borotetrafluoride.

Specific examples of the organic semiconductor include an organic semiconductor comprising a benzene-pyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing a repeating unit represented by formula (1) or (2):

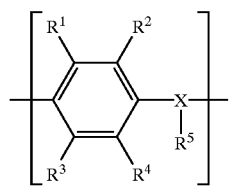

(1)

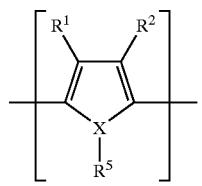

(2)

(wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring).

The term "mainly comprising an electrically conducting polymer" as used in the present specification means that even an electrically conducting polymer containing components derived from impurities in the starting material monomer of the organic semiconductor can be contained, that is, "an electrically conducting polymer is contained as a substantially effective component".

Examples of the polymer containing a repeating unit represented by formula (1) or (2) include polyaniline, polyoxyphenylene, polyphenylene sulfide, polythiophene, polyfuran, polypyrrole, polymethylpyrrole, and derivatives of these polymers.

Examples of the dopant which can be used include sulfoquinone-base dopants, anthracene monosulfonic acid-base dopants and other various anionic dopants. Also, an electron acceptor dopant such as $NO^+$ or $NO_2^+$ salt may be used.

Specific examples of the inorganic semiconductor include inorganic semiconductors mainly comprising lead dioxide or manganese dioxide, and inorganic semiconductors comprising triiron tetroxide.

These semiconductors may be used individually or in combination of two or more thereof.

When the organic or inorganic semiconductor used has an electrical conductivity of $10^{-2}$ to $10^3$ $S \cdot cm^{-1}$, the manufactured capacitor can have a smaller impedance value and can be more increased in the capacitance at a high frequency.

In the case where the another part electrode is a solid, an electrical conducting layer may be provided thereon so as to attain good electrical contact with an exterior leading line (for example, lead frame).

The electrical conducting layer can be formed, for example, by the solidification of an electrically conducting paste, the plating, the metallization or the formation of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conducting paste applied is then solidified by allowing it to stand in an air or under heating. Examples of the plating include nickel plating, copper plating, silver plating and aluminum plating. Examples of the metal to be vapor-deposited include aluminum, nickel, copper and silver.

In practice, for example, a carbon paste and a silver paste are stacked in this order on the another part electrode and these are molded with a material such as epoxy resin, thereby fabricating a capacitor. This capacitor may have a niobium or tantalum lead which is sintered and molded integrally with the niobium sintered body or welded afterward.

The thus-fabricated capacitor of the present invention is jacketed using, for example, resin mold, resin case, metallic jacket case, resin dipping or laminate film, and then used as a capacitor product for various uses.

In the case where the another part electrode is liquid, the capacitor fabricated from the above-described two electrodes and the dielectric material is housed, for example, in a can electrically connected to the another part electrode to complete a capacitor. In this case, the electrode side of the niobium sintered body is guided outside through the above-described niobium or tantalum lead and at the same time, insulated from the can using an insulating rubber or the like.

BEST MODE FOR CARRYING OUT THE INVENTION

The present invention is described in greater detail below by referring to the Examples and Comparative Examples.

The methods for measuring and evaluating the physical properties in each Example are described below.

(1) Oxygen and Nitrogen Content of Niobium Powder

These contents were determined using a nitrogen and oxygen analyzer manufactured by LEKO.

(2) Capacitance of Capacitor

The capacitor capacitance was determined as an average capacitance value of 50 units of capacitors manufactured.

(3) Leakage Current Characteristics (LC)

A rated voltage (4 V) was continuously applied between the terminals of a capacitor at room temperature for 1 minute and thereafter, a leakage current value was determined. The capacitor having a current value of 100 $\mu$A or less was judged non-defective. This evaluation was performed on 50 units of capacitors.

Furthermore, after the manufactured capacitor was left standing at 125° C. for 1,000 hours and then returned to room temperature, a high temperature accelerated test was performed and the leakage current value was determined in the same manner. The capacitor having a current value of 100 $\mu$A or less was judged non-defective. This evaluation was also performed on 50 units of capacitors.

EXAMPLES 1 TO 5 AND COMPARATIVE EXAMPLES 1 AND 2

A niobium primary powder having an average particle size of 1 $\mu$m was left standing at 1,100° C. for 30 minutes under 6×10$^{-3}$ Pa and then taken out and cracked, whereby a niobium powder having an average particle size of 80 $\mu$m was granulated. This niobium powder was left standing at 300° C. in a nitrogen stream to obtain a partially nitrided niobium powder having a nitrided amount of 2,500 ppm. Subsequently, 50 g of the obtained niobium powder was left standing in an air at 130° C. By varying the standing time, niobium powders (specific surface area: 2.8 m$^2$/g) each having an oxygen content shown in Table 1 were obtained.

This niobium powder was molded together with a 0.30 mm$\phi$ niobium lead to obtain a molded article having a size of 4.5×3.5×1.8 mm. This molded article was sintered at 1,150° C. in a vacuum for 100 minutes. After lowering the temperature, the molded article was taken out at 50° C. and thereby, a sintered body (specific surface area: 0.9 m$^2$/g) was manufactured. Thereafter, the sintered body obtained was electrochemically formed at 80° C. in an aqueous 0.1% phosphoric acid solution to form an oxide dielectric film layer composed of niobium oxide on the surface.

An operation of alternately dipping this sintered body in a pyrrole vapor and in a saturated aqueous solution containing ammonium persulfate and sodium anthraquinone sulfate was repeated, whereby a cathode layer composed of polypyrrole was formed on the oxide dielectric film. On this cathode layer, a carbon paste layer and a silver paste layer were stacked in this order. After mounting on a lead frame, these were molded with an epoxy resin to manufacture a capacitor. The manufactured capacitor was measured and evaluated on the capacitance, the leakage current characteristics and the leakage current characteristics after the high-temperature standing test. The results obtained are shown in Table 1.

EXAMPLES 6 TO 10 AND COMPARATIVE EXAMPLES 3 AND 4

A niobium primary powder having an average particle size of 0.7 $\mu$m was left standing at 950° C. for 30 minutes under 6×10$^{-3}$ Pa and then taken out and cracked to obtain an agglomerated powder having an average particle size of 3 $\mu$m. This agglomerated powder was further left standing at 1,100° C. for 30 minutes under 6×10$^{-3}$ Pa and then taken out and cracked, thereby granulating a niobium powder having an average particle size of 100 $\mu$m. This granulated niobium powder was left standing at 300° C. in a nitrogen stream to obtain a partially nitrided niobium powder having a nitrided amount of 3,400 ppm. Subsequently, 50 g of the obtained niobium powder was left standing in an air at 130° C. By varying the standing time, niobium powders (specific surface area: 4.9 m$^2$/g) each having an oxygen content shown in Table 2 were obtained.

Using each of these niobium powders, sintered bodies (specific surface area: 1.4 m$^2$/g) were manufactured in the same manner as in Example 1. After forming an oxide dielectric film layer thereon, an operation of alternately dipping each sintered body in a saturated aqueous lead acetate solution and in a saturated aqueous ammonium persulfate solution was repeated to form a cathode layer composed of lead dioxide and lead sulfate (lead dioxide: 97% by mass) on the oxide dielectric film layer. On this cathode layer, respective paste layers were stacked in the same manner as in Example 1 and thereby a capacitor was manufactured. The thus-obtained capacitor was measured and evaluated on the capacitance, the leakage current characteristics and the leakage current characteristics after the high-temperature standing test. The results obtained are shown in Table 2.

TABLE 1

| | Oxygen Content, mass % | Capacitance, $\mu$F | Number of LC Non-Defective Units | Number of LC Non-Defective Units After Accelerated Test |
| --- | --- | --- | --- | --- |
| Example 1 | 3.2 | 630 | 50/50 | 50/50 |
| Example 2 | 4.5 | 620 | 50/50 | 50/50 |
| Example 3 | 5.7 | 640 | 50/50 | 50/50 |

TABLE 1-continued

|  | Oxygen Content, mass % | Capacitance, μF | Number of LC Non-Defective Units | Number of LC Non-Defective Units After Accelerated Test |
|---|---|---|---|---|
| Example 4 | 7.6 | 620 | 50/50 | 50/50 |
| Example 5 | 8.8 | 640 | 50/50 | 50/50 |
| Comparative Example 1 | 2.7 | 630 | 50/50 | 39/50 |
| Comparative Example 2 | 9.6 | 640 | 49/50 | 49/49 |

TABLE 2

|  | Oxygen Content, mass % | Capacitance, μF | Number of LC Non-Defective Units | Number of LC Non-Defective Units After Accelerated Test |
|---|---|---|---|---|
| Example 6 | 3.3 | 950 | 50/50 | 50/50 |
| Example 7 | 4.8 | 930 | 50/50 | 50/50 |
| Example 8 | 5.5 | 950 | 50/50 | 50/50 |
| Example 9 | 7.4 | 940 | 50/50 | 50/50 |
| Example 10 | 8.6 | 950 | 50/50 | 50/50 |
| Comparative Example 3 | 2.6 | 940 | 50/50 | 38/50 |
| Comparative Example 4 | 10.2 | 950 | 47/50 | 47/47 |

When Examples 1 to 5 are compared with Comparative Example 1 in Table 1 and Examples 6 to 10 with Comparative Example 3 in Table 2, it is seen that the deterioration of the performance after the accelerated test can be prevented by incorporating a predetermined amount of oxygen into a niobium powder. Also, from the results in Examples and Comparative Examples 2 and 3, it is seen that if the oxygen content exceeds a predetermined amount of 9% by mass, some capacitors suffer from failure in the initial LC value.

INDUSTRIAL APPLICABILITY

By using the niobium powder of the present invention having an average particle size of from 10 to 500 μm, which is adjusted to have an oxygen content of 3 to 9% by mass, a capacitor reduced in the deterioration after the accelerated test, prevented from deterioration in the performance for a long period of time and having high reliability can be manufactured.

What is claimed is:

1. A niobium powder for capacitors, having an average particle size of from 10 to 500 μm, which is a granulated powder having an oxygen content of 3 to 9% by mass.

2. The niobium powder for capacitors as claimed in claimed 1, wherein the specific surface area is from 0.2 to 15 m²/g.

3. The niobium powder for capacitors as claimed in claim 1, which is partially nitrided.

4. The niobium powder for capacitors as claimed in claim 3, wherein the nitrided amount is 10~100,000 ppm by mass.

5. A sintered body using the niobium powder for capacitors claimed in claim 1.

6. The sintered body as claimed in claim 5, wherein the specific surface area is from 0.2 to 5 m²/g.

7. A capacitor fabricated from the sintered body claimed in claim 5 or 6 as one part electrode, a dielectric material formed on the surface of the sintered body, and another part electrode provided on the dielectric material.

8. The capacitor as claimed in claim 7, wherein the dielectric material is mainly composed of a niobium oxide.

9. The capacitor as claimed in claim 8, wherein the niobium oxide is formed by electrolytic oxidation.

10. The capacitor as claimed in claim 7, wherein the another part electrode is at least one material selected from an electrolytic solution, an organic semiconductor or an inorganic semiconductor.

11. The capacitor as claimed in claim 10, wherein the another part electrode is composed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising two or more repeating units represented by the following formula (1) or (2):

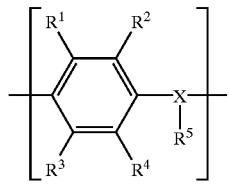

(1)

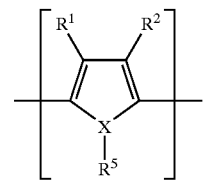

(2)

(wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents hydrogen or an alkyl group having from 1 to 6 carbon atoms, and each of the pairs $R^1$ and $R^2$, and $R^3$ and $R^4$ may combine with each other to form a ring).

12. The capacitor as claimed in claim 11, wherein the organic semiconductor is at least one member selected from polypyrrole, polythiophene polyaniline and substitution derivatives thereof.

13. The niobium powder for capacitors as claimed in claim 2, which is partially nitrided.

* * * * *